PARALLELED SEMICONDUCTOR INVERTER POWER SUPPLY
Filed Nov. 20, 1959
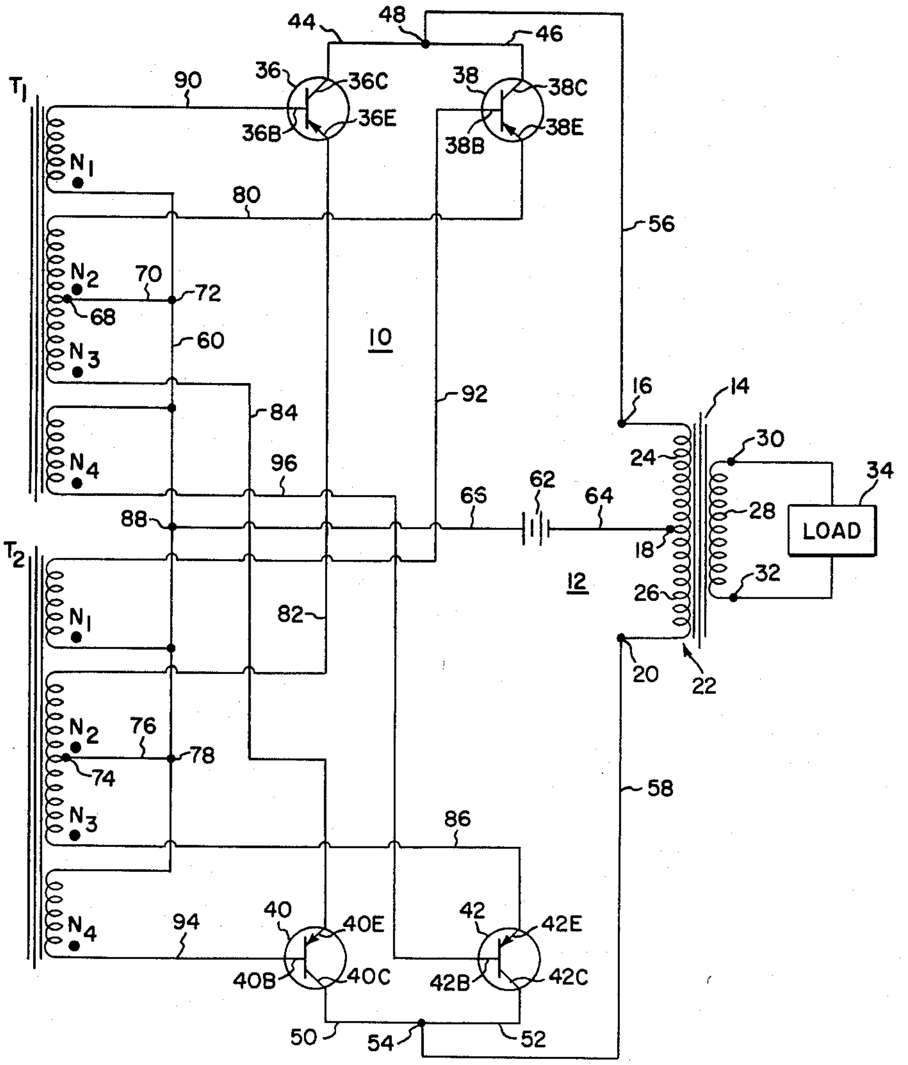
INVENTOR.
JAMES LEE JENSEN
BY Omund R. Dahle
ATTORNEY United States Patent Office 3,118,115
Patented Jan. 14, 1964

3,118,115

PARALLELED SEMICONDUCTOR INVERTER POWER SUPPLY

James Lee Jensen, St. Louis Park, Minn., assignor to Minneapolis-Honeywell Regulator Company, Minneapolis, Minn., a corporation of Delaware Filed Nov. 20, 1959, Ser. No. 854,282
4 Claims. (Cl. 331—113)

This invention relates generally to electronic power inverter circuits for converting direct current to alternating current and more specifically to an improvement in such circuits whereby a plurality of current control devices may be operated in parallel such that the amount of power per unit of time deliverable to an utilization device is increased over that which can be obtained when only one such device is used.

Recently, power inverters utilizing transistors therein as the current control or switching means have found wide application in systems wherein a step-up of direct current voltage level is required. Because the transistor is relatively insensitive to shock and vibration, is small in size and light in weight, and has a long operating life, power inverters utilizing transistors are rapidly replacing inverters of the vibrating contact type and the rotating machine type. As an example of one form of a transistor power inverter, consider a power supply circuit suitable for use with a photographic flash system. The power supply itself may comprise the conventional circuit of a pair of transistors arranged in an inverter to convert low voltage direct current into high voltage alternating current and a rectified and filter network for converting said high voltage alternating current to a high voltage direct current which may then be used to energize a load. The load in a photographic flash system is generally a capacitor, the discharge of which is used to supply energy to a flash tube. Although a circuit of the type described may operate satisfactorily in most instances, it has been proved to be desirable to provide a means for recharging the capacitor after a flash as rapidly as possible. In an inverter with only a single pair of transistors operating in a push-pull mode, the current deliverable to a load is limited by the current rating of a single transistor and hence the time in the charging interval must be increased.

The present invention provides means for increasing the current handling capabitities of inverter type circuits by utilizing a plurality of transistors in parallel such that the amount of current which may be sent to a load is increased. Since the total load current is split or shared by a plurality of transistors, the load current may be increased without exceeding the maximum rating of any one transistor. Furthermore, means are provided for insuring that equality of current flow is maintained in each branch of the parallel circuit, thereby eliminating the runaway hazard which often occurs when an attempt is made to operate transistors in parallel.

It is, therefore, an object of this invention to provide an improved electrical inverter circuit.

Another object of this invention is to provide a means whereby the power handling capabilities of an electronic direct current to alternating current inverter circuit may be increased.

It is still another object of my invention to provide a means whereby a plurality of transistors may be successfully operating in parallel in an electronic inverter circuit.

Yet another object of the present invention is to provide apparatus whereby a plurality of transistors, which make up the inverter circuit of this invention, are forced to share, in a predetermined proportion, the total current flowing to the load.

These and other objects of the present invention will become more apparent as the description proceeds, taken in connection with the accompanying drawing, wherein there is shown a circuit diagram of a preferred embodiment of the present invention.

Referring now to the drawing, there is shown generally at 10 an inverter circuit according to the teachings of this invention. Inverter 10 has output means indicated generally by numeral 12. The output means, which is here shown as a transformer 14, has a plurality of input terminals including input terminal 16, intermediate terminal 18, and input terminal 20. Intermediate tap 18 divides the primary winding 22 of transformer 14 into an upper section 24 and a lower section 26. Secondary winding 28 of transformer 14 is provided with a pair of output terminals 30 and 32 which are adapted to be connected to load means 34. Load means 34 is not restricted to any particular configuration and may, for example, include a capacitor to be charged and rectifier and filter means for converting the alternating signals induced in secondary winding 28 into direct current signals.

Inverter 10 also includes a plurality of current control means, here shown as transistors 36, 38, 40 and 42. The above mentioned transistors are illustrated as being of the PNP type but it should be understood that NPN transistors may also be used, provided the proper polarity conventions are observed. Transistor 36 is provided with a first output or emitter electrode 36E, a second output or collector electrode 36C and an input, control, or base electrode 36B. In the same manner, transistors 38, 40, and 42 have corresponding electrodes which are identified by the same identifying letters as used with transistor 36. The collector electrodes 36C and 38C are electrically joined by means of a conductor 44 and a conductor 46 which meet at a common junction 48. Similarly, the collector electrodes 40C and 42C are joined electrically by means of conductors 50 and 52 to a common junction 54. A conductor 56 electrically connects junction 48 to the first input terminal 16 of transformer 14. Likewise, a conductor 58 connects common junction 54 to the second input terminal 20 of output transformer 14. It can be seen then that the collector electrodes 36C and 38C are effectively connected in parallel with one another as are collector electrodes 40C and 42C.

Connected between the intermediate tap 18 on the primary winding 22 of transformer 14 and a bus bar 60 is a circuit energizing means 62, here shown as a battery. The negative terminal of battery 62 is connected to tap 18 by means of a conductor 64, whereas a conductor 66 connects the positive terminal of battery 62 to bus bar 60.

In order to obtain oscillatory type action in the circuit there is provided a plurality of regenerative feedback signal generating means here shown as transformers $T_1$ and $T_2$. Transformer $T_1$ has a plurality of windings including windings $N_1$, $N_2$, $N_3$, and $N_4$. Likewise, transformer $T_2$ also has a plurality of windings $N_1$, $N_2$, $N_3$, and $N_4$. The windings $N_2$ and $N_3$ on each of the transformers may be considered as input or primary windings, whereas the windings $N_1$ and $N_4$ in each case serve as output or secondary windings. The intermediate tap 68 between windings $N_2$ and $N_3$ on transformer $T_1$ is connected by means of a conductor 70 to a junction 72 on bus bar 60. Likewise, the intermediate tap 74 between primary windings halves $N_2$ and $N_3$ on transformer $T_2$ is connected by means of a conductor 76 to a junction 78 on bus bar 60. A conductor 80 connects the upper end of winding $T_1N_2$ to the emitter electrode 38E of transistor 38. The upper end of primary winding half $T_2N_2$ is connected by means of a conductor 82 to the emitter electrode 36E of transistor 36. A conductor 84 similarly connects the lower terminal of primary winding half $T_1N_3$ to the emitter electrode 40OE of transistor 40, whereas the conductor 86 connects the lower end of primary winding half $T_2N_3$ to the emitter electrode 42E of transistor 42.

If it is assumed that both transistors 36 and 38 are in a conductive state and transistors 40 and 42 are nonconducting, a current path may be traced from the positive terminal of battery 62 through conductor 66 where it divides into two parts at junction 88 on bus bar 60. From junction 88, a first portion of the current flows upward through bus bar 60, through junction 72, conductor 70, intermediate tap 68, primary winding half $T_1N_2$, conductor 80, and through the emitter to collector junction of transsistor 38 and the conductor 46 to junction 48. The other portion of the current flowing into junction 88 flows downward through bus bar 60 through junction 78, through conductor 76, intermediate tap 74, primary winding half $T_2N_2$, conductor 82, through the emitter to collector junction of transistor 36 and conductor 44 to junction 48. At junction 48 the currents again combine and flow through the conductor 56, the upper input terminal 16 of primary winding 22, the upper section 24 of primary winding 22, the intermediate tap 28 and the conductor 64 to the negative terminal of battery 62. Thus it can be seen that the transistors 36 and 38 are connected in parallel with one another between the bus bar 60 and the common junction 48.

By tracing through the circuit in a similar manner when transistors 40 and 42 are conducting and transistors 36 and 38 are nonconducting, it can be seen that the transistors 40 and 42 are effectively connected in parallel with one another between bus bar 60 and common junction 54, the winding half $T_1N_3$ being in series with the emitter electrode 40E and winding half $T_2N_3$ being in series with the emitter electrode 42E.

To insure that at any instant of time the conducting ones of said plurality of transistors are sharing the load current in a predetermined proportion, the secondary windings on transformers $T_1$ and $T_2$ are cross coupled to provide regenerative feedback signals to the base electrodes of said transistors. More specifically, the upper end of secondary winding $T_1N_1$ is connected by means of a conductor 90 to the base electrode 36B of transistor 36. The base electrode 38B of transistor 38 is connected by means of a conductor 92 to the upper terminal of secondary winding $T_2N_1$. The base electrode 40B of transistor 40 is connected via conductor 94 to the lower terminal of secondary winding $T_2N_4$. Likewise, the lower terminal of secondary winding $T_1N_4$ is connected by means of a conductor 96 to the base electrode 42B of transistor 42.

*Operation*

Considering now the operation of the circuit, the potential from the direct current circuit energizing means 62 is to be converted to an alternating current potential by means of the inverter circuit 10, such that a relatively high voltage alternating current signal is developed across the output terminals 30 and 32 of output transformer 14. If the circuit operation is being considered at the time that battery 62 is switched into the circuit it is likely that one of the transistors 36, 38, 40 or 42 will tend to allow more current to flow from its emitter electrode to its collector electrode than will be carried by the remaining transistors. This may be due to the fact that the transistor parameters are not perfectly symmetrical. The feedback arrangement is such that it continues and magnifies this effect upon one pair of transistors thus reducing their collector resistance rapidly to a value close to zero. The other pair of transistors for which the feedback signal is positive, are cut off at this time.

Assume, for example, that it is transistor 38 that begins to conduct more heavily than the remaining transistors. As a result there will be an increased current flowing from the positive terminal of battery 62 through conductors 66, 60 and 70. This current flowing upward through the primary winding half $T_1N_2$ causes signals to be induced in the secondary windings $T_1N_1$ and $T_1N_4$ which are inductively coupled to the core of transformer $T_1$. Because of the manner in which the secondary windings are poled, the signal applied to the base electrode 36B of transistor 36 through conductor 90 will be more negative than the potential applied to its emitter electrode 36E. Hence the impedance offered to the flow of current between the emitter and collector electrodes of transistor 36 will be reduced thereby tending to equalize the initially assumed difference in impedance characteristics existing between transistors 36 and 38. Also, it can be observed from the polarity markings on secondary windings $T_1N_4$ that the signal applied to the base electrode 42B of transistor 42 through conductor 96 will be positive, thereby backbiasing transistor 42 and insuring that it remains nonconductive.

The effect of the reduced impedance between electrodes 36E and 36C is to cause an increase in current flowing from source 62 through conductors 66, 60 and 76. This increased current flowing upward through primary winding half $T_2N_2$ which is in series with the emitter electrode 36E causes signals to be induced in the secondary windings $T_2N_1$ and $T_2N_4$. The signal induced in secondary winding $T_2N_4$ is effective to further back-bias transistor 40 whereas the signal induced in secondary winding $T_2N_1$ is of the proper polarity to further reduce the impedance offered between the emitter electrode and the collector electrode of transistor 38.

As is perhaps now obvious, the reduction in the impedance between electrodes 38E and 38C causes still a further increase in current to flow from source 62 through conductors 66, 60 and 70 and through the primary winding half $T_1N_2$. As mentioned before, this increase in current through winding $T_1N_2$ causes a still more negative signal to be applied to the base electrode 36B of transistor 36, and a more positive signal to be applied to the base electrode 42B of transistor 42.

This type of action continues until the current in the circuit reaches a limit as determined by the reflected load impedance, the emitter to collector impedance of the transistors, and the magnitude of the source. The bias induced in windings $T_1N_1$ and $T_2N_1$ must be of sufficient magnitude to keep the transistors 36 and 38 in their highly conductive states. The required bias current is proportional to the difference between the current flowing in windings $T_1N_2$ and $T_2N_2$ and the magnetization current requirements of the transformers $T_1$ and $T_2$ respectively. The transistors 36 and 38 therefore remain in their voltage cutoff region until the cores of the transformers $T_1$ and $T_2$ saturate. When saturation occurs, the magnetization current requirements of these transformers increase, thereby limiting the drive current available to the bases 36B and 38B. These two transistors are thus rendered nonconductive. The reflux in the cores of the transformers $T_1$ and $T_2$ tend to collapse, thereby reversing the polarity of the voltages induced in the windings such that transistors 36 and 38 are back-biased and current conduction is initiated in transistors 40 and 42.

Should there exist a difference in the current gain characteristics between transistors 40 and 42 such that transistor 40 initially conducts a greater portion of the total load current, there will be an increase in current flowing from the positive terminal of source 62 and through conductors 66, 60 and 70. Since primary winding half $T_1N_3$ is in series with the emitter electrodes 40E of transistor 40 there will also be an increase in current flowing downward through said winding which is effective to induce signals in the secondary winding $T_1N_1$ and $T_1N_4$. The signal applied to the base electrode 36B of transistor 36 by way of secondary winding $T_1N_1$ is now of a positive polarity and hence, increases the back-bias on said transistor. The signal applied to the base electrode 42B of transistor 42 by way of winding half $T_1N_4$ and conductor 96, however, will be negative and causes the impedance between the emitter and collector electrode of transistor 42 to be reduced, thereby tending to equalize the initially assumed difference.

In a similar manner as mentioned previously in connection with the case when transistors 36 and 38 were conducting, the transistors 40 and 42 remain in their voltage cutoff region until the cores of the two transformers $T_1$ and $T_2$ saturate. Upon saturation, the magnetization current requirements of these transformers increase, thereby reducing the drive current available to the bases 40B and 42B. These two transistors are therefore rendered nonconductive. The flux in the cores of transformers $T_1$ and $T_2$ tends to collapse, thereby reversing the polarity of the voltages induced in the windings such that transistors 40 and 42 are back-biased and current conduction is again initiated in transistors 38 and 40 thus initiating a new cycle.

It can be seen then, that the total load current flows from the battery 62 and alternately from a junction 88 to the junction 48 and from the junction 88 to the junction 54 and to one side of the primary winding of output transformer 14 to the negative source terminal of battery 62. When transistors 36 and 38 are conducting, the load current, after combining at junction 48, flows through conductor 56 and downward through primary winding half 24 of transformer 14 to the intermediate tap 18 and from there through conductor 64 to the negative terminal of battery 62. When transistors 40 and 42 are conducting, however, the load current after combining at junction 54 flows through conductor 58 and upward through the primary winding half 26 of transformer 14 to the intermediate tap 18. It can be seen that the current alternately flowing downward through winding half 24 and then upward through winding half 26 is effective to induce an alternating current potential across the secondary winding output terminals 30 and 32.

Because of the manner in which the feedback is developed and applied to the control electrodes of the various transistors, differences in conductivity, which may exist due to differences in the current gain characteristics of the transistors, is diminished. For example, if the current gain of transistor 36 exceeds that of transistor 38, more current flows from the emitter 36E to the collector 36C than flows from 38E to 38C for the same base drive when these particular transistors are allowed to conduct. The resulting larger current flowing through winding $T_2N_2$ than flowing through $T_1N_2$ induces a larger feedback signal in $T_2N_1$ than is induced in $T_1N_1$. Since winding $T_2N_1$ is cross-coupled to the base electrode 38B and winding $T_1N_1$ is cross-coupled to base electrode 36B, more base drive current is supplied to transistor 38 than is supplied to transistor 36, thereby tending to compensate for the initially assumed lower current gain of transistor 38. By a similar analysis, it can be observed that whenever a given transistor tends to carry more than its share of the total load current, feedback signals are developed and applied to the control electrodes of the other transistor, which is conducting at the same time, to cause the current distribution between them to be equalized.

One possible modification of the circuit described herein is to replace the saturable core feedback transformers with transformers of the nonsaturating type, thereby relying on the voltage cutoff characteristics of the transistors to limit the current in the circuit at the time reversal is desired. Upon reaching this limit in the group of conducting transistors, the rate of change of flux in the cores of these transformers tends to drop to zero thereby reducing the base drive on the conducting transistors. This cuts off the current flow in the circuit which completely collapses the magnetic field and produces a voltage in the opposite direction, triggering the other group of transistors into operation.

Thus it can be seen that there is provided by this invention a means whereby a plurality of transistors may be made to operate in a parallel mode in an oscillatory type circuit to increase the current per cycle deliverable to a load. It is perhaps obvious that the details of the circuit used in an exemplary embodiment of the concepts of this invention may be modified so as to operate more than two transistors in parallel. One means of operating more than two transistors in parallel can be achieved by introducing additional feedback transformers to provide the appropriate control signals thereto.

Inasmuch as modifications may be readily made by those skilled in the art in accordance with the basic invention, this invention is to be considered as limited only in accordance with the features thereof and as set forth in the claims appended thereto.

What is claimed is:

1. Apparatus for increasing the power handling capabilities of an oscillatory type circuit comprising: output means having a plurality of input terminals, inverter means comprising a first and second plurality of transistors each having a pair of output electrodes and an input electrode; direct current circuit energizing means; circuit means including said output means input terminals connecting a first terminal of said energizing means to the first of said pair of output electrodes on said first and second plurality of transistors; a plurality of transformer means each having an input winding and a plurality of output windings; circuit means including said input windings connecting a second terminal of said energizing means to the second of said pair of output electrodes on said first and second plurality of transistors; and circuit means including said plurality of output windings connecting said second terminal of said energizing means to said input electrodes on said first and second plurality of transistors such that said first and second plurality of transistors are alternately driven from a substantially nonconducting state to a relatively highly conductive state and are forced to share equally the total load current flowing through said highly conductive ones of said plurality of transistors.

2. Apparatus for paralleling transistors in an inverter circuit for increasing the power per cycle deliverable to a load comprising: a first and second plurality of transistors each having an emitter electrode, a collector electrode and a base electrode; a plurality of saturable transformers each having primary and secondary windings; means including the primary windings on said saturable transformers for connecting one of said emitter and collector electrodes of each of said transistors in common with a first terminal of a direct current source means, a separate portion of said primary windings being connected respectively to each of said plurality of transistors; means including output means for connecting the other of said emitter and collector electrodes of each of said transistors in common with a second terminal of said source means; and means including the secondary windings on said plurality of transformers connected to said base electrodes, the secondary winding connected to said base electrode being wound on another of said transformers than that carrying the primary winding connected to the emitter of that transistor for cross-coupling regeneratively the signals induced from a transformer associated with one of said first plurality of transistors with the base electrode of another of said first plurality of transistors such that said first and second plurality of transistors are alternately driven between a state of relatively low conduction and a state of relatively high conduction and such that said transistors in said highly conductive state are forced to share the total current flowing to said output means.

3. Apparatus for balancing currents in paralleled transistors in an oscillatory type direct current to alternating current inverter circuit for increasing the power handling capabilities of said circuit comprising: a first and second plurality of transistors each having at least an input electrode and first and second output electrodes; load means; a direct current source having first and second terminals; means including said load means connecting the first output electrodes of said first plurality of transistors to said first terminal of said source and connecting the first output electrodes of said second plurality of transistors to said first terminal of said source; a plurality of transformer means each having primary and secondary windings; means including said primary windings of said plurality of transformers connecting the second output electrodes of said transistors to the second terminal of said source, a first primary winding of a first of said transformers being connected to said second output electrode of a first of said plurality of transistors, a second primary winding of said first transformer being connected to said second output electrode of a first of said second plurality of transistors, a first primary winding of a second of said transformers being connected to said second output electrode of a second of said first plurality of transistors, and a second primary winding of said second transformer being connected ot said second output electrode of a second of said second plurality of transistors; and means including the secondary windings of said transformers connecting said input electrodes to the second terminal of said source, a first secondary winding of said first transformer being connected to said input electrode of said second of said first plurality of transistors, a second secondary winding of said first transformer being connected to said input electrode of said second of said second plurality of transistors, a first secondary winding of said second transformer being connected to said input electrode of said first of said first plurality of transistors, and a second secondary winding of said second transformer being connected to said input electrode of said first of said second plurality of transistors for cross-coupling the regenerative feedback signal from a transformer primary winding associated with one of said first plurality transistors to said input circuit of another of said first plurality transistors such that said first plurality of transistors are together driven to a relatively highly conductive state while said second plurality of transistors are together driven to a relatively low conduction state and vice versa in sequence thereby developing an alternating signal across said load means.

4. Apparatus for balancing the currents of paralleled semiconductor current control means in an oscillatory type direct current to alternating current inverter circuit for increasing the power handling capabilities of said circuit comprising: a plurality of semiconductor current control means including at least first, second, third and fourth such means each having an input and a pair of input and a pair of output electrodes; means including regenerative signal generating means comprising a plurality of saturable transformers, a first of said transformers having at least first and second primary winding means and first and second secondary winding means, a second of said transformers having at least third and fourth primary winding means and third and fourth secondary winding means; a direct current source having first and second terminals; means connecting a first of said pair of output electrodes of each of said semiconductor current control means through said primary winding means to the first terminal of said source said first primary winding being connected to said first semiconductor means, said second primary winding being connected to said fourth semiconductor means, said third primary winding being connected to said second semiconductor means and said fourth primary winding being connected to said third semiconductor means; load means having a pair of input terminals; means including the input terminals of said load means connecting the second terminal of said source to the other of said pair of output electrodes of said plurality of semiconductor current control means for connecting said other output electrodes in parallel with one another and in circuit with said load means and said direct current source; and means including said secondary winding means connecting the first terminal of said source to said input electrodes, said first secondary winding being connected to said second semiconductor means, said second secondary winding being connected to said third semiconductor means, said third secondary winding being connected to said first semiconductor means and said fourth secondary winding being connected to said fourth semiconductor means for cross-coupling the signals from a transformer associated with one semiconductor current control means output electrodes with said input electrodes on another of said plurality of semiconductor current control means such that said plurality of semiconductor current control means are together driven from a substantially nonconductive state to a relatively highly conductive state in a cyclic manner and are forced to share equally the total load current flowing when said semiconductor current control means are in their highly conductive state.

References Cited in the file of this patent

UNITED STATES PATENTS

| | | |
|---|---|---|
| 2,070,446 | Mittag | Feb. 9, 1937 |
| 2,080,250 | Bedford | May 11, 1937 |
| 2,774,878 | Jensen | Dec. 18, 1956 |
| 2,953,754 | Roesel | Sept. 20, 1960 |

OTHER REFERENCES

Article by Pye in Electronic & Radio Engineer, March 1959, pages 96–105.